United States Patent
Han et al.

(10) Patent No.: US 10,633,954 B2
(45) Date of Patent: Apr. 28, 2020

(54) MITIGATION OF SAND PRODUCTION IN SANDSTONE RESERVOIR USING THERMALLY EXPANDABLE BEADS

(71) Applicant: Saudi Arabian Oil Company, Dhahran (SA)

(72) Inventors: Yanhui Han, Katy, TX (US); Feng Liang, Cypress, TX (US); Mohammad Hamidul Haque, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 230 days.

(21) Appl. No.: 15/701,140

(22) Filed: Sep. 11, 2017

(65) Prior Publication Data

US 2019/0078420 A1   Mar. 14, 2019

(51) Int. Cl.
| | |
|---|---|
| *E21B 43/04* | (2006.01) |
| *E21B 43/08* | (2006.01) |
| *E21B 43/02* | (2006.01) |
| *C09K 8/56* | (2006.01) |
| *E21B 34/06* | (2006.01) |
| *E21B 34/00* | (2006.01) |

(52) U.S. Cl.
CPC ........... *E21B 43/04* (2013.01); *C09K 8/56* (2013.01); *E21B 43/025* (2013.01); *E21B 43/08* (2013.01); *E21B 34/06* (2013.01); *E21B 2034/007* (2013.01)

(58) Field of Classification Search
CPC ........ E21B 43/04; E21B 43/08; E21B 43/025; E21B 2034/007; E21B 34/06; C09K 8/56
See application file for complete search history.

(56) References Cited

U.S. PATENT DOCUMENTS

| | | | |
|---|---|---|---|
| 4,102,399 | A | 7/1978 | Harnsberger |
| 6,935,432 | B2 | 8/2005 | Nguyen |
| 7,318,481 | B2 | 1/2008 | Richard |
| 7,926,565 | B2 | 4/2011 | Duan et al. |
| 8,048,348 | B2 | 11/2011 | Duan et al. |
| 8,662,172 | B2 | 3/2014 | Panga et al. |
| 8,672,023 | B2 | 3/2014 | O'Malley |
| 8,680,027 | B2 | 3/2014 | Simon |
| 8,783,349 | B2 | 7/2014 | Zhu et al. |
| 8,980,799 | B2 | 3/2015 | Duan et al. |
| 9,228,420 | B2 | 1/2016 | Mazyar et al. |
| 2004/0181003 | A1 | 9/2004 | Murakami et al. |

(Continued)

OTHER PUBLICATIONS

The International Search Report and Written Opinion for related PCT application PCT/US2018/049876 dated Nov. 22, 2018.

*Primary Examiner* — David Carroll
(74) *Attorney, Agent, or Firm* — Bracewell LLP; Constance G. Rhebergen; Linda L. Morgan (57) ABSTRACT

Systems and methods for producing fluids from a subterranean well include introducing expandable beads into a target region of a production zone of the subterranean well, the expandable beads being formed of thermally expandable material in an unexpanded condition with a first diameter. A radial confining stress is increased and a hoop stress is decreased within the target region by thermally expanding the expandable beads so that the beads are in an expanded condition with a second diameter, the second diameter being greater than the first diameter.

19 Claims, 8 Drawing Sheets

(56) References Cited

U.S. PATENT DOCUMENTS

| | | | | |
|---|---|---|---|---|
| 2009/0143259 A1* | 6/2009 | Robertson | ............... | E21B 43/25 |
| | | | | 507/267 |
| 2011/0247812 A1* | 10/2011 | Panga | ...................... | C09K 8/56 |
| | | | | 166/278 |
| 2012/0305238 A1* | 12/2012 | Duan | ........................ | C08J 3/24 |
| | | | | 166/192 |

* cited by examiner

EX_2 Contours

-8.00E+06
-7.00E+06
-6.00E+06
-5.00E+06
-4.00E+06
-3.00E+06
-2.00E+06
-1.00E+06
-0.00E+06

Contour interval = 1.00E+06

FIG. 5

EX_2 Contours

-6.00E+06
-5.00E+06
-4.00E+06
-3.00E+06
-2.00E+06
-1.00E+06
-0.00E+06

Contour interval = 1.00E+06

FIG. 6 reservoir
expandable beads
Plasticity Indicator elastic, at yield in past
at yield in tension

FIG. 7 reservoir
 expandable beads

Plasticity Indicator

FIG. 8

Pore pressure contours 2.70E+07
2.80E+07
2.90E+07
3.00E+07
3.10E+07
3.20E+07
3.30E+06
3.40E+07

Contour interval = 1.00E+06

FIG. 9

MITIGATION OF SAND PRODUCTION IN SANDSTONE RESERVOIR USING THERMALLY EXPANDABLE BEADS

BACKGROUND OF THE DISCLOSURE

1. Field of the Disclosure

The disclosure relates generally to improved oil and gas recovery in oil field applications, and more particularly to mitigating sand production and reducing mechanical failure of near-wellbore rock.

2. Description of the Related Art

The production of hydrocarbons, and in particular production from unconsolidated or poorly consolidated formations, can result in the production of sand along with the hydrocarbons. Produced sand is undesirable for many reasons. Sand is abrasive to components within the well, such as tubing, pumps and valves, and must be removed from the produced fluids at the surface. In addition, produced sand can partially or completely clog the well, requiring an expensive workover. Sand flowing from the formation can also result in a cavity within the formation, which can result in the formation caving and the casing collapsing.

During production operations, in near-wellbore and perforation regions, the stress concentration can be high and the confining stress and pore pressure can be low. In such a situation, the rock of the formation can easily run into mechanical failure, which can significantly reduce the effective horizontal confining stresses, disturbing the balance between the rock strength and the in-situ stresses. Alternately, as the reservoir pore fluids squeeze into the well or perforation cavities, the pressure gradient can be relatively very high in the near-well and perforation regions, so some grains in the mechanically failed area may be carried by the pore fluids and transported to the production well, with the result that some amount of sand grains is produced together with the reservoir fluids. Sand-production related issues, such as borehole instability, casing collapse, well cleaning, erosion of equipment, sand disposal and removal, and restricted production rates are very costly to the hydrocarbon industry every year.

Common sand control solutions can be classified into either mechanical or chemical methods. Mechanical methods of sand control prevent sand production by stopping the formation with liners, screens or gravel packs. Chemical control methods involve injecting chemicals such as resins into the formation to consolidate the sand grains.

Gravel pack completions rely on the bridging of formation sand with larger well-sorted sand pack which have been retained by a slotted liner or screen. The size of the well-sorted sand pack is typically 4-6 times larger than the median size ($d_{50}$) of the formation sand. Gravel packs create a permeable downhole filter that will allow the production of the formation fluids but restrict the entry and production of formation sand. In this type of completion well, the reservoir fluids flow through the sand pack into the wells.

To alleviate the sand production problem, a gravel pack can include filling the annulus around tubing or perforations with sands or other proppants. The gravel pack alleviates sand production through filtering or trapping the formation sands and providing support stress to the well wall as (in response to the reduction of bottom hole pressure) the formation moves inwards compressing the gravel pack:

$$\Delta \sigma_\theta = -\sigma_{pack} \frac{a^2}{r^2} \quad (1)$$

$$\Delta \sigma_r = \sigma_{pack} \frac{a^2}{r^2} \quad (2)$$

Where:
$\sigma_{pack}$ is the effective mean stress in the pack;
a is the well radius;
r is the location in the near well region;
$\Delta \sigma_\theta$ is the elastic tangential stress change induced by pack; and
$\Delta \sigma_r$ is the elastic radial stress change induced by pack.

In terms of mechanics, the support stress provided by the gravel inside the well can reduce the tangential stress and increases the radial stress around the well. Consequently, the deviatoric stress near the well is reduced and the shear yielding region can be eliminated or reduced thus the sand production can be alleviated.

It is noted that, in equations (1) and (2), the radial and tangential stressed are introduced by the effective mean stress in the pack, which is generated as a response to the inward radial movement of the surrounding formation. However, the sandstone can mechanical yield due to the movement required to introduce such stresses. In addition, particles in the conventional gravel pack are angular which results in lower permeability and can easily produce excessive sand in the depletion process that will further reduce the hydraulic conductivity of the pack.

SUMMARY OF THE DISCLOSURE

Embodiments of this disclosure include systems and methods for injecting expandable beads or a mixture of expandable beads and conventional gravel pack materials to fill a space between a sand screen and the formation, including in any perforations after the completion of the well and before the production of hydrocarbons. Due to the temperature increase, such as through contact with reservoir fluids, the beads will expand after the bottom hole pressure is reduced to achieve planned drawdown. The volume expansion of the expandable bead pack inside annulus space and perforations will introduce additional mechanical pressure on the well bore and perforation walls, which will subsequently decrease the hoop stress and increase the radial confining stress in the near-well and perforation regions. Systems and methods will in this way mitigate both mechanical failure of the formation rock and sand production. In addition, thermally expandable beads are more round than traditional gravel pack which reduces the risk of causing lower permeability and results in a reduction of the amount of produced sands in the depletion process relative to using a traditional gravel pack.

In an embodiment of this disclosure a method for mitigating sand production from a subterranean well includes introducing expandable beads into a target region of a production zone of the subterranean well, the expandable beads being formed of thermally expandable material in an unexpanded condition with a first diameter. A radial confining stress is increased and a hoop stress is decreased within the target region by thermally expanding the expandable beads so that the expandable beads are in an expanded condition with a second diameter, the second diameter being greater than the first diameter.

In alternate embodiments, introducing the expandable beads into the target region can include introducing the expandable beads into a packing space between an outer diameter of a screen and an inner surface of the subterranean well. A material volume of the expandable beads in the expanded condition can be greater than the material volume of the expandable beads in the unexpanded condition. The expandable beads can be substantially spherical when in the unexpanded condition and when in the expanded condition.

In other alternate embodiments, in the expanded condition the expandable beads can form a formed pack within the target region. The formed pack can include non-degradable materials so that a mechanical strength of the formed pack is maintained. Thermally expanding the expandable beads can include heating the expandable beads with reservoir fluids. The thermally expandable material can be selected from a group consisting of a polymeric material, a reinforced composite, and a metallic material. Before introducing the expandable beads into the target region of the production zone of the subterranean well, the expandable beads can be mixed with conventional gravel pack materials.

In an alternate embodiment of this disclosure, a method for mitigating sand production from a subterranean well includes locating a base pipe within a wellbore of the subterranean well, locating a screen exterior of the base pipe, and introducing expandable beads into a packing space between an outer diameter of the screen and an inner surface of the subterranean well at a target region of a production zone of the subterranean well. The expandable beads are formed of homogeneous polymer and having a first diameter in an unexpanded condition. A radial confining stress is increased and a hoop stress within the target region is decreased by increasing a material volume of the expandable beads by thermally expanding the expandable beads so that the expandable beads are in an expanded condition with a second diameter, the second diameter being greater than the first diameter.

In alternate embodiments the expandable beads can be substantially spherical when in the unexpanded condition and when in the expanded condition. In the expanded condition the expandable beads can form a formed pack within the target region, the formed pack including non-degradable materials so that the increased radial confining stress and the decreased hoop stress is maintained. Thermally expanding the expandable beads can include heating the expandable beads with a geothermal heat of the target region.

In yet another alternate embodiment of this disclosure, a system for mitigating sand production from a subterranean well includes expandable beads located in a target region of a production zone of the subterranean well. The expandable beads are formed of thermally expandable material having an unexpanded condition with a first diameter. The expandable beads are operable to increase a radial confining stress and decrease a hoop stress within the target region after thermally expanding the expandable beads so that the expandable beads are in an expanded condition with a second diameter, the second diameter being greater than the first diameter.

In alternate embodiments the expandable beads can be located in a packing space between an outer diameter of a screen and an inner surface of the subterranean well. A base pipe can be included within a wellbore of the subterranean well, and the screen can be located exterior of the base pipe. A material volume of the expandable beads in the expanded condition can be greater than the material volume of the expandable beads in the unexpanded condition. The expandable beads can be substantially spherical when in the unexpanded condition and when in the expanded condition. In the expanded condition the expandable beads can form a formed pack within the target region. The formed pack can include non-degradable materials and can be operable to maintain the increased radial confining stress and decreased hoop stress. The thermally expandable material can be selected from a group consisting of a polymeric material, a reinforced composite, and a metallic material. The expandable beads can be mixed with conventional gravel pack materials.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The inventive subject matter is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
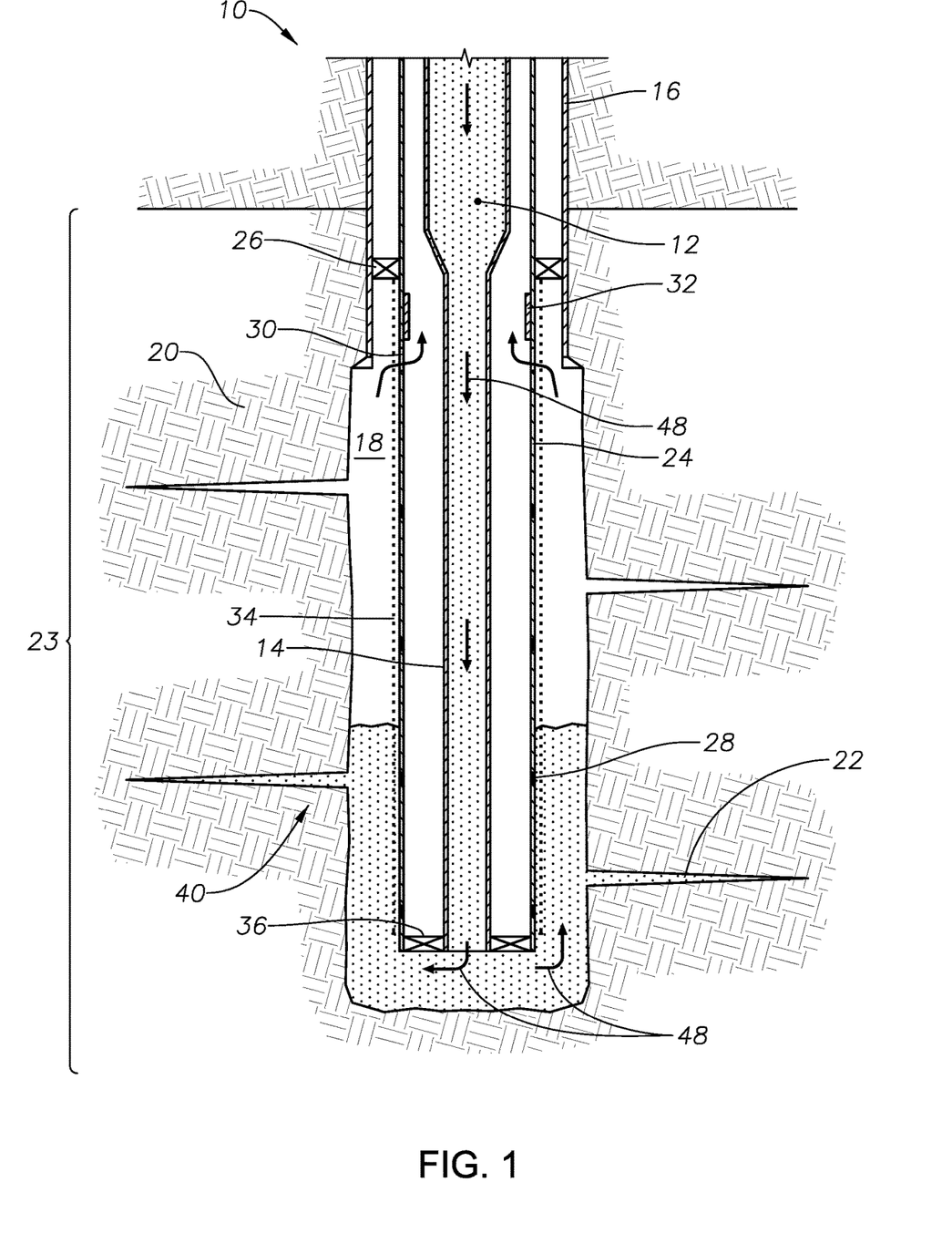
FIG. 1 is section view of a subterranean well showing the introduction of expandable beads in accordance with an embodiment of this disclosure.

Looking at FIG. 1, an example embodiment of a system for producing fluids from subterranean well 10 is shown. In FIG. 1, subterranean well 10 is being injected with expandable beads 12. Delivery tubing 14 extends into subterranean well 10. Delivery tubing 14 can be, for example, coiled tubing, a string of jointed pipe, wash pipe, or other tubular member that can be lowered into subterranean well 10.

Subterranean well 10 can have casing 16 that lines wellbore 18. Casing 16 provides support to wellbore walls, and isolates wellbore 18 from sand and other particulate matter that might otherwise enter the wellbore 18 from formation 20. Formation 20 can circumscribe subterranean well 10 and include one or more productions zones that contain hydrocarbons to be produced. Perforations 22 can extend radially outward from the side walls of wellbore 18 and into formation 20. Perforations 22 provide fluid channels for hydrocarbons and other fluids within production zone 23 of formation 20 to flow into wellbore 18. In the alternate embodiment of FIG. 2, there may be no perforations.

In the example embodiment of FIG. 1, base pipe 24 can extend within wellbore 18 at an elevation of the formation 20. Packer 26 circumscribes base pipe 24 and seals the annular space between an outer diameter of base pipe 24 and an inner diameter of casing 16. Base pipe 24 includes a number of production ports 28 that can be plugged during the introduction of expandable beads 12 into subterranean well 10. Production ports 28 extend radially through a side wall of base pipe 24. The plugs of production ports 28 can be degradable and rupture, dissolve, or otherwise are removed when introduced to downhole conditions of pressure and temperature and/or fluids. Fluid communication takes place through production ports 28 with removal or loss of the plugs. In alternate embodiments, there may be no production ports 28 when base pipe is introduced into wellbore 18, and instead production ports can be formed at a later time through known perforation techniques.

Base pipe 24 can also include valved port 30 that can be opened and closed with a valve member 32. Valved port 30 extends radially through the sidewall of base pipe 24. In the example of FIG. 1, valve member 32 can include a sliding sleeve that slides axially to open and close valved port 30. When valved port 30 is in an open position, fluid can circulate between the annulus between the outer diameter of base pipe 24 and the inner diameter of casing 16, and a space inside the bore of base pipe 24.

Screen 34 is located exterior of base pipe 24 and can be located along an outer surface of base pipe 24 and circumscribe base pipe 24. Screen 34 is shown extending from packer 26 to device 36, which is located proximate to a lower end of base pipe 24. Screen 34 has openings sized to allow the flow of fluids through screen 34 and impede the flow of expandable beads 12 through screen 34.

Device 36 circumscribes delivery tubing 14 and seals the annular space between an outer diameter of delivery tubing 14 and an inner diameter of base pipe 24. Device 36 blocks communication between a lower end of wellbore 8 and the annular space between an outer diameter of delivery tubing 14 and an inner diameter of base pipe 24 so that expandable beads pumped through delivery tubing 14 can be delivered to target region 40, as illustrated by arrows 48 of FIG. 1. In an alternate embodiment, the bottom end of the delivery tubing 14 can insert into a shoe (not shown) mounted in a lower end of base pipe 24 and which is used in lieu of device 36.

Figure 2:
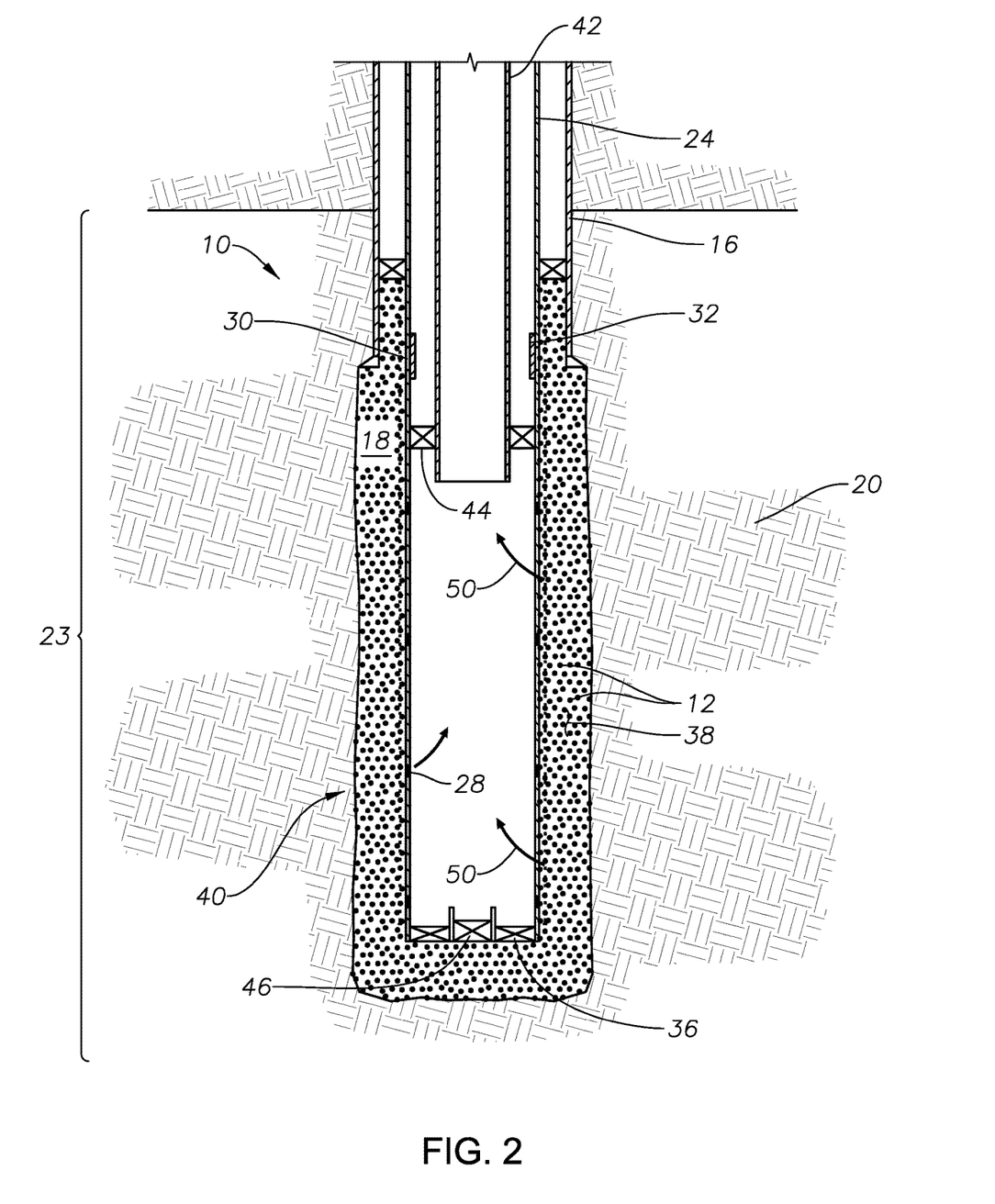
FIG. 2 is a section view of a subterranean well showing the expandable beads in an expanded condition and fluids being produced from the subterranean well, in accordance with an embodiment of this disclosure.

In the example of FIGS. 1-2, a portion of wellbore 18 is lined with casing 16 and another portion is "open hole" or barefoot. It should be pointed out that the wellbore completion system of embodiments of this disclosure is not limited to the embodiments of FIGS. 1-2, but can be used in wellbores having casing along their entire lengths, or wellbores having no casing, or in other alternate wellbore completion configurations known in the art.

Expandable beads 12 can be formed of, as an example, polymeric materials such as silicone rubber, polyimide (PI), polyetheretherketone (PEEK), polyetherimide (PEI), polyphenylene-sulfide (PPS), fluoropolymers, fiber reinforced composites, metallic materials, and other known materials that have high stiffness (low deformability), high service temperature, high thermal expansion coefficient while not suffering much from mechanical properties reduction, reasonably good thermal conductivity and that are cost effective. As an example, for these materials, the modulus of elasticity can be in a range of approximately 400-600 thousand pound per square inch (kpsi), the thermal expansion coefficient can be in a range of $1\text{-}50\times 10^{-5}$/degrees Fahrenheit (° F.), and the service temperature can be in a range of 340-500° F. Within these ranges of mechanical and thermal properties, the radial strain increment induced by temperature increase does not exceed 5%, so there is no significant loss of the porosity and permeability in the bead pack. As an example, the thermal and mechanical properties of the material of expandable beads 12 formed of silicon rubber are approximately as follows:

Bulk modulus: $K=2$ gigapascal (GPa)
Poisson's ratio: $v=0.49$
Thermal expansion coefficient: $\alpha=500\times 10^{-6}$/° F.
Service temperature: $T=440°$ F.

Expandable beads 12 can be introduced into subterranean well alone or in a mixture that also includes conventional gravel pack materials such as, for example, gravel, sand, or a combination of gravel and sand. In other embodiments, expandable beads 12 can be mixed with other unconventional pack materials, which may be packing materials other than gravel or sand. Expandable beads 12, whether alone or in a mixture with conventional or other unconventional pack materials, or both conventional and other unconventional, can be introduced in subterranean well 10 in an unexpanded condition and can be thermally expandable to an expanded condition. In the unexpanded condition, expandable beads 12 have a first diameter and in the expanded condition, expandable beads 12 have a second diameter that is larger than the first diameter. In an example embodiment, the expandable beads 12 can have a first diameter in a range of 0.3-1.5 millimeters (mm).

Figure 4:
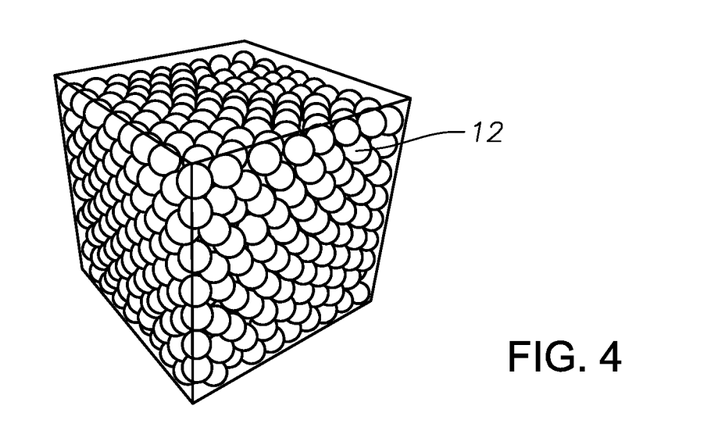
FIG. 4 is a schematic perspective view of a modelled packing of the expandable beads within a target region of a production zone, in accordance with an embodiment of this disclosure.

Expandable beads 12 can be substantially spherical in shape when in the unexpanded condition and when in the expanded condition. As can be seen in FIG. 4, the substantially spherical shape of expandable beads 12 can provide a formed pack that has a predicable packing pattern that will provide fluid paths suitable for the production of hydrocarbons, while providing the necessary forces to increase radial confining stress and decrease hoop stress within the target region of formation 20, as disclosed in this disclosure.

Expandable beads 12 can thermally expand from an unexpanded condition to an expanded condition by maintaining a substantially spherical shape and increasing in material volume. That is, the volume of the material that makes up an expandable bead 12 in an expanded condition is greater than the volume of material that makes up such expandable bead 12 in an unexpanded condition. The material that makes up an expandable bead 12 expands to increase in volume without substantially changing the shape of such expandable bead 12. Therefore, the material volume of expandable beads 12 in the expanded condition is greater than the material volume of expandable beads 12 in the unexpanded condition.

In the expanded condition expandable beads 12 form a formed pack 38 (FIG. 2) within a target region 40. Formed pack 38 can include non-degradable material so that the increased radial confining stress and the decreased hoop stress is maintained. Having a quickly degradable material in formed pack 38 would reduce the performance of formed pack 38 with the degradation of the degradable material. In embodiments of this disclosure, formed pack 38 has a sufficient amount of non-degradable material so that if any included degradable material was to degrade, the performance of formed pack 38 would be maintained. As an example, in embodiments of this disclosure, formed pack 38 can be expected to perform for one to five years. In certain embodiments, formed pack 38 can be free of degradable materials.

In certain embodiments of this disclosure, expandable beads 12 can have either a neutral surface property or a water wet surface property. Having a neutral surface property or a water wet surface property provides for a more efficient oil transport than having an oil wet surface property.

The material of expandable beads 12 can be selected so that expandable beads 12 remain in an unexpanded condition until expandable beads are in position within target region 40. Target region 40 can include packing space between an outer diameter of screen 34 and an inner surface of subterranean well 10, including within perforations 22 (FIG. 1). Target region 40 is within production zone 23 of subterranean well 10.

After expandable beads 12 have been located within target region 40 delivery tubing 14 can be removed. In the example embodiment of FIG. 2, production tubing 42 can be used for delivering produced fluids from formation 20 to the surface. During production operations, production packer 44 can circumscribe production tubing 42 and seal the annular space between the outer diameter of production tubing 42 and an inner diameter of base pipe 24. Production packer 44 can be located axially below valved port 30 so that valved port 30 could be used for circulating fluids in future operations. Bottom packer 46 can seal the open space proximate to the bottom of base pipe 24 that was previously utilized by delivery tubing 14.

After expandable beads 12 are located within target region 40, a higher temperature can thermally expand expandable beads 12 to form formed pack 38. As an example, expandable beads 12 can be heated by a geothermal heat of target region 40. Alternately, the temperature of reservoir fluids can be much higher than the temperature of completion fluids and expandable beads can be heated by the higher temperature reservoir fluids. As the production starts, the reservoir fluids can heat up expandable bead 12. Because the thermal expansion is limited within the confined space of target region 40, a significant effective mean stress will be generated inside formed pack 38, which will be imposed on the wall and inside perforations 22 (FIG. 1) of subterranean well 10 as support stress, which will increase radial confining stress and decrease a hoop stress within target region 40.

In an example of operation, looking at FIG. 1, expandable beads 12 can be introduced into target region 40 of production zone 23 of subterranean well 10 in an unexpanded condition. In certain embodiments, expandable beads 12 can be mixed with traditional pack material to provide a more cost effective system. The mixed pack material can be used in applications where the sanding risk is not severe. Expandable beads 12 can be, for example, injected down delivery tubing 14, out a bottom end of base pipe 24, and flow into packing space between an outer diameter of screen 34 and an inner surface of subterranean well 10, including within perforations 22, as illustrated by arrows 48 of FIG. 1.

Expandable beads 12 can be carried to target region 40 in a slurry. As the expandable beads move upwards within target region 40, fluids that was previously located within target region 40 can be displaced and circulated out of target region 40 through valved port 30, which is in an open position. Screen 34 will prevent expandable beads 12 from exiting target region 40 through valved port 30. Slurry that carried expandable beads 12 can also circulate out of target region 40 through valved port 30 or can leak off in full or in part into formation 20. The example embodiment of FIG. 1 is one possible circulation technique for delivering expandable beads 12 into target region 40. In alternate embodiments, other known crossover circulation techniques can be used to deliver expandable beads 12 into target region 40.

If the height of target region 40 is H, the radius of wellbore 18 is Rw, the outer radius of sand screen 34 is Rs, the porosity of the pack of expandable beads 12 is n, and the bulk density of expandable beads 12 is ρ, then the weight of expandable beads 12 needed to fill target region 40 (without perforations 22) can be estimated by:

$$W_{beads\ P} = \rho \pi (R_w^2 - R_S^2) H (1-n)$$

Looking at FIG. 2, after expandable beads 12 have filled target region 40, valved port 30 can be closed by valve member 32 so fluids can no longer pass though valved port 30. Delivery tubing 14 (FIG. 1) has been removed and production tubing 42 is located within wellbore 18 with a portion of production tubing 42 being located within a portion of base pipe 24.

If formation 20 is a weakly consolidated sandstone reservoir, the fluid pressure inside the well (bottom-hole pressure, BHP or PBH) will be reduced below the reservoir pressure (PRES). The pressure difference between the BHP and far-field reservoir pressure, so called drawdown, drives the reservoir fluids to flow into subterranean well 10. The reduction of BHP will cause concentration of effective tangential (hoop) stress near the well, $\sigma_\theta$ (FIG. 3), to increase. As a result, the region near the wellbore can run into mechanical yielding and sands can be produced with the reservoir fluids.

To mitigate this potential issue, expandable beads can be heated within target region 40 to supply sufficient stress support to the wall of subterranean well 10 without requirement on the inward movement of the surrounding formation. Expandable beads 12 can thermally expand by geothermal heat within target region 40 or by the heat of production fluids, such as when the production fluids are produced through expandable beads 12. Expandable beads 12 thermally expand to form formed pack 38, which will act on the rock of target region 40 and increase radial confining stress and decreasing a hoop stress within target region 40. Production fluids can flow through formed pack 38, through production ports 28, and into production tubing 42, as shown by arrows 50 of FIG. 2. With accurate measurement of in-situ stresses, pore pressure and temperature, in addition to laboratory determination of mechanical properties for the reservoir rocks in laboratory tests, an idea packing factor can be identified for the beads through a series of numerical discrete element numerical modeling.

Numerical Modeling

The validity of the systems and methods of this disclosure have been demonstrated through numerical modeling. Silicone rubber was used as an example thermally expandable material for expandable beads 12. Such rubber materials typically have high bulk modulus but low Young's modulus because their Poisson's ratio is approaching 0.5. Such rubber materials are stiff in taking volumetric loading but not stiff in uniaxial loading.

Note that the stiffness of rubber bead pack will be lower than that of a single expandable bead 12. The stiffness of the modeled bead assembly of FIGS. 3-4 was measured by performing isotropic compression test on a sample of collection of rubber beads in a DEM (discrete element method) based software PFC3D (Itasca Consulting Group, Inc., 2014). The numerical simulations indicate that the stiffness of the bead collection can be one or two order lower that of single bead, depending on the Poisson's ratio, particle size, distributions, and other characteristic factors.

Figure 3:
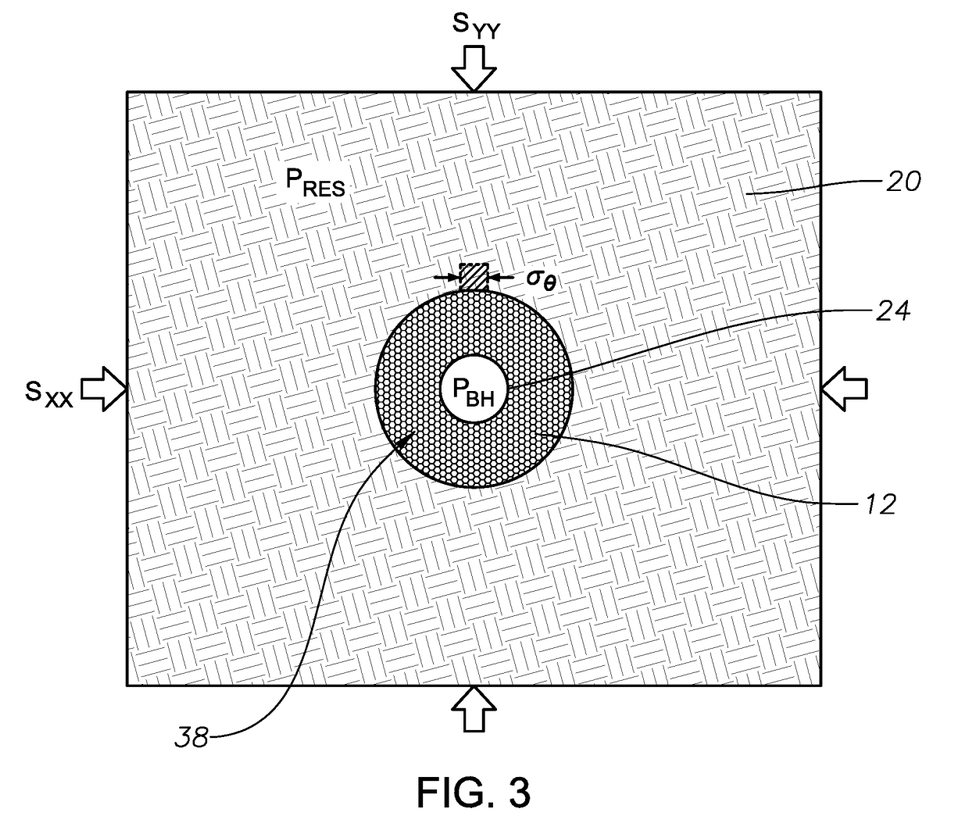
FIG. 3 is a cross section view of a modelled subterranean well having the expandable beads in accordance with an embodiment of this disclosure.
Figure 5:
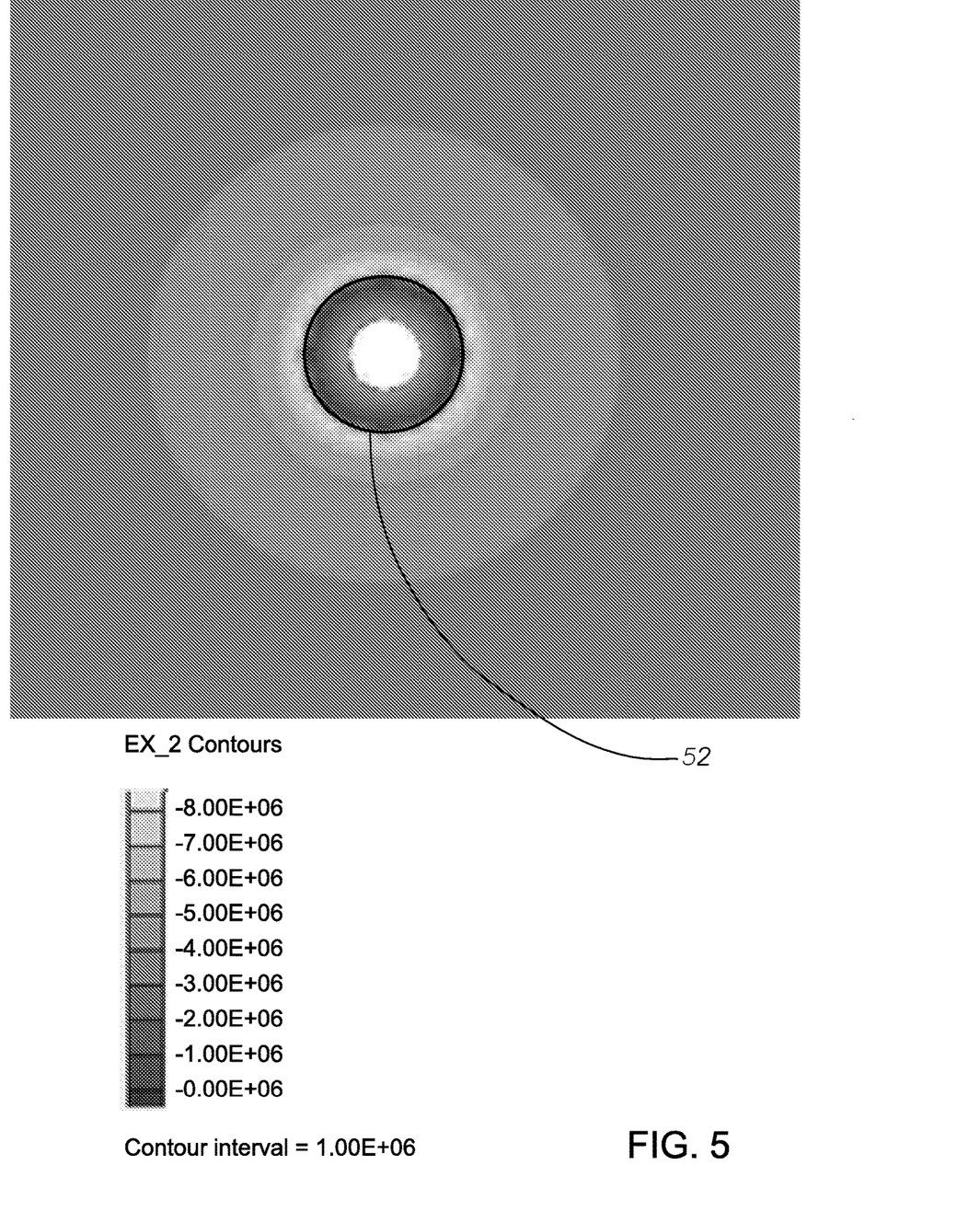
FIG. 5 is a cross section view of a modelled subterranean well having a prior art proppant pack, showing effective tangential stress distribution at a drawdown of 500 pound per square inch (psi).
Figure 6:
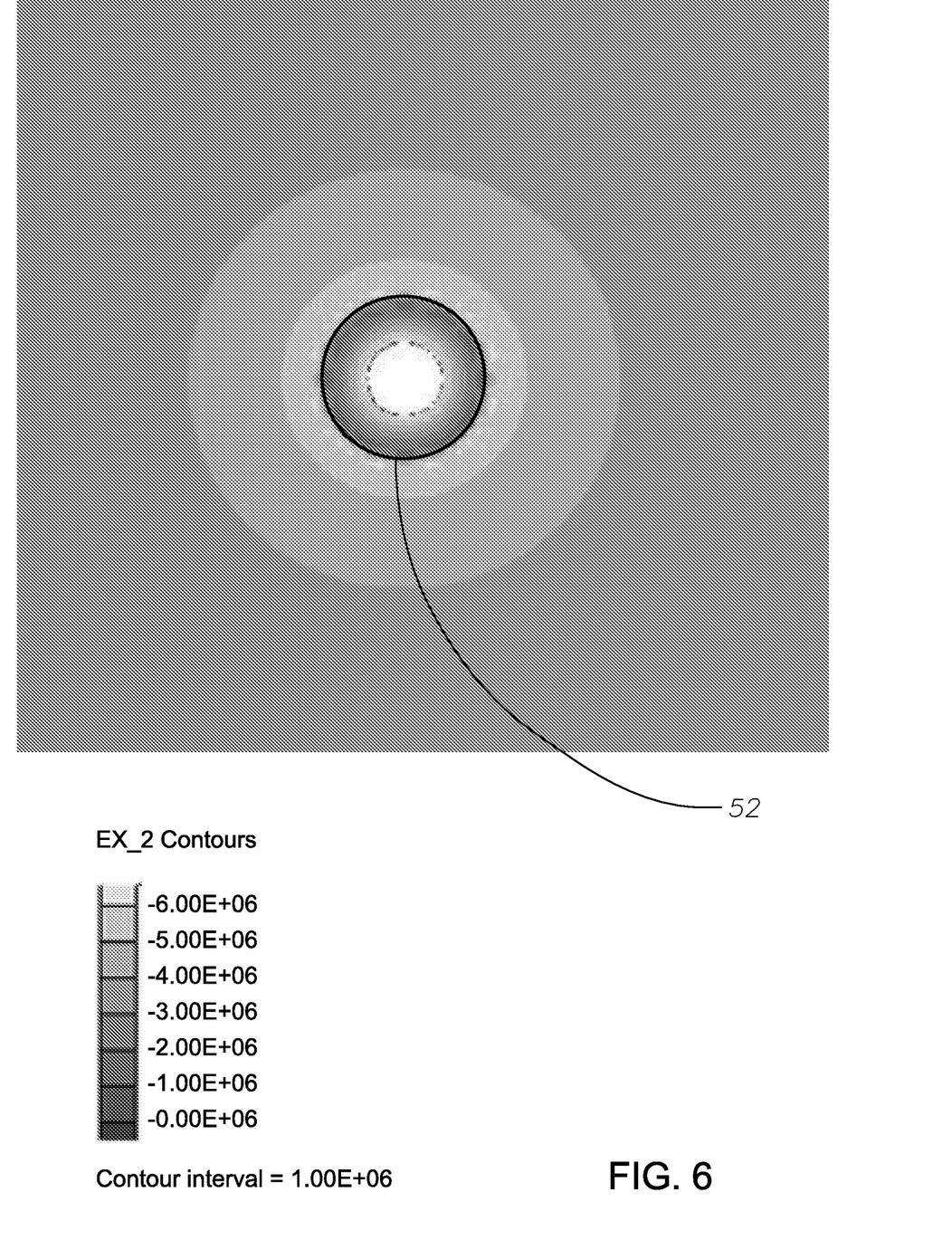
FIG. 6 is a cross section view of a modelled subterranean well having the expandable beads in accordance with an embodiment of this disclosure, showing effective tangential stress distribution at a drawdown of 1000 psi.
Figure 9:
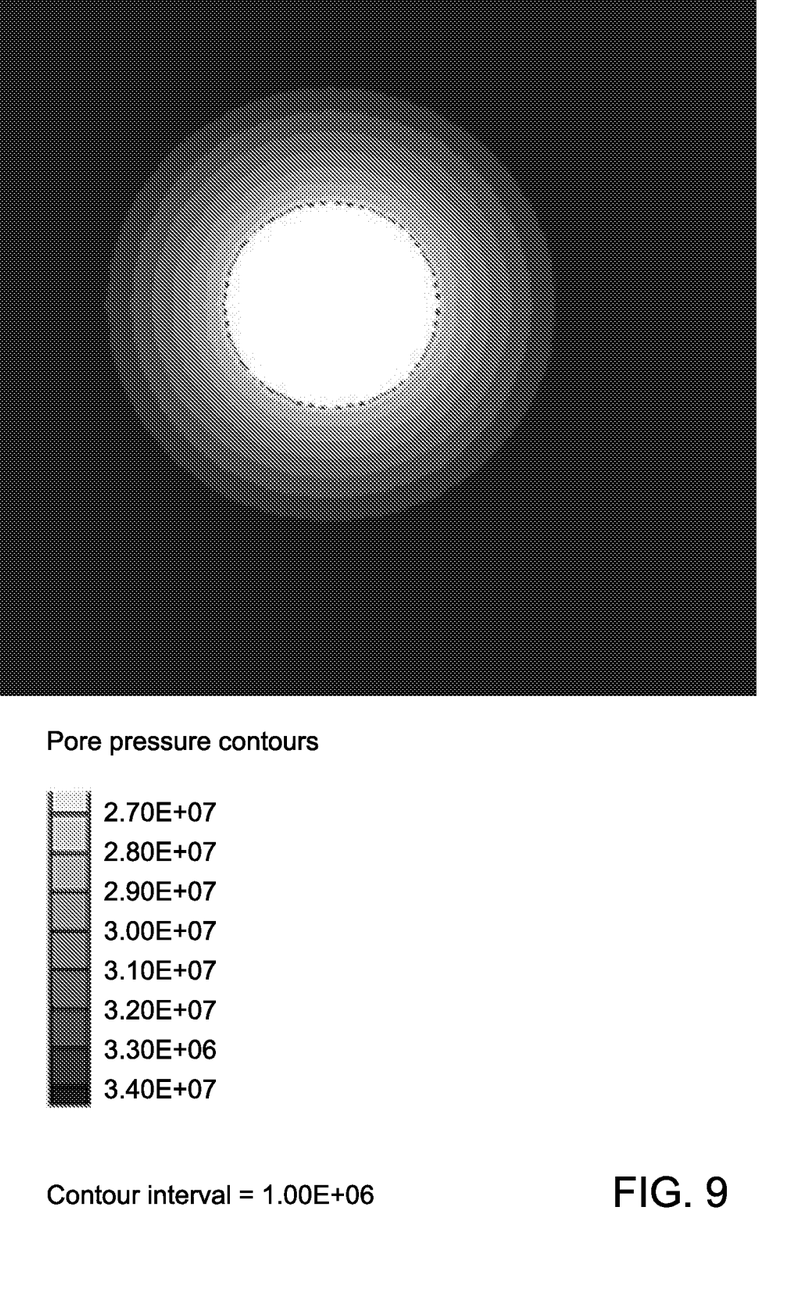
FIG. 9 is a cross section view of a modelled subterranean well having the expandable beads in accordance with an embodiment of this disclosure, showing a pore pressure distribution at drawdown of 1000 psi.

The conceptual production well model was built in FLAC (Itasca Consulting Group, Inc., 2011) as shown in FIG. 3. The borehole diameter was made to be 22 cm and the tubing diameter was 10 cm. The extension of the model was 10 times the borehole diameter. The weakly consolidated sandstone (reservoir formation) was given a bulk modulus of 2 GPa, a shear modulus of 0.8 GPa, a dry density of 1850 kilograms per meters cubed (Kg/m3), a porosity of 0.3, and a permeability of 300 millidarcy (mD). The assembly of rubber beads was assumed to have bulk modulus of 20 megapascal (MPa), a Poisson's ratio of 0.49, a cohesive strength of 3.45 MPa (500 psi), a frictional angle of 32 degrees, and a permeability of 3 Darcy. In FIGS. 5-6, the outer diameter 52 of formed pack 38 is labeled. In FIG. 9, the outer diameter of formed pack 38 is located at an outer diameter of the outermost visible pore pressure contour ring. The reservoir pressure was 5000 psi. The far-field in-situ stress was 37.9 MPa (5500 psi) in both directions. The BHP started at 34.5 MPa (5000 psi) then dropped to 27.6 MPa (4000 psi), simulating transition from completion stage to production stage.

Figure 7:
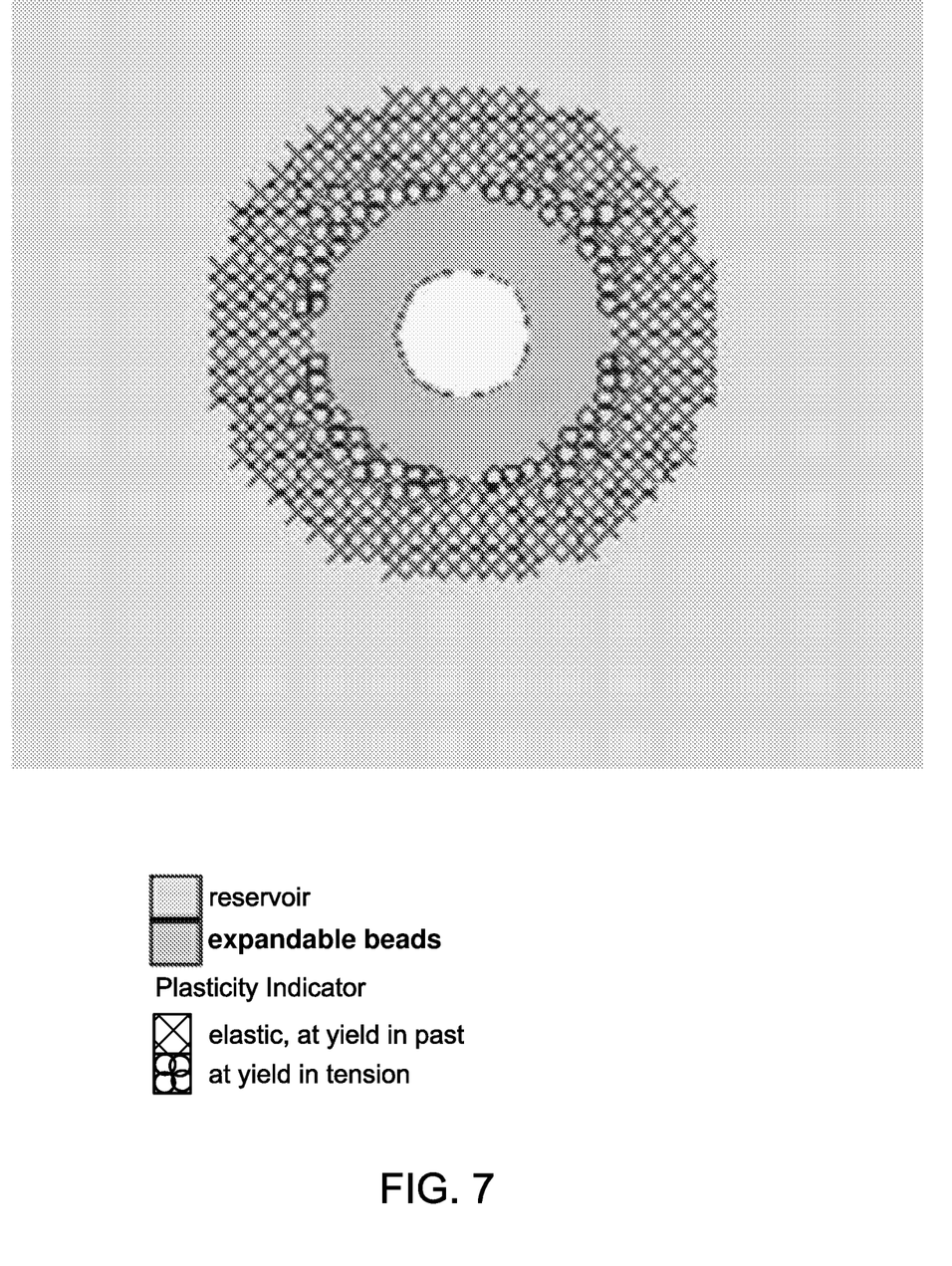
FIG. 7 is a cross section view of a modelled subterranean well having a prior art proppant pack, a mechanical yielding region at drawdown of 1000 psi.

FIGS. 5 and 9 display the distributions of pore pressure and effective tangential stress at steady state at 1000 psi drawdown (4000 psi BHP). The maximum effective tangential stress in the reservoir formation is around 8 MPa. FIG. 7 shows that extensive plastic yielding has developed around the well. "Plasticity indicator" indicates the mechanical damage status at a location in the formation, for example, "elastic, at yield in past" indicates the marked location has experienced plastic yielding in the past but currently it is in elastic state, while "at yield in tension" shows the marked location is experiencing plastic yielding in tension.

The linear thermal expansion strain can be calculated from equation (3):

$$\varepsilon_L^T = \alpha \Delta T \quad (3)$$

Figure 8:
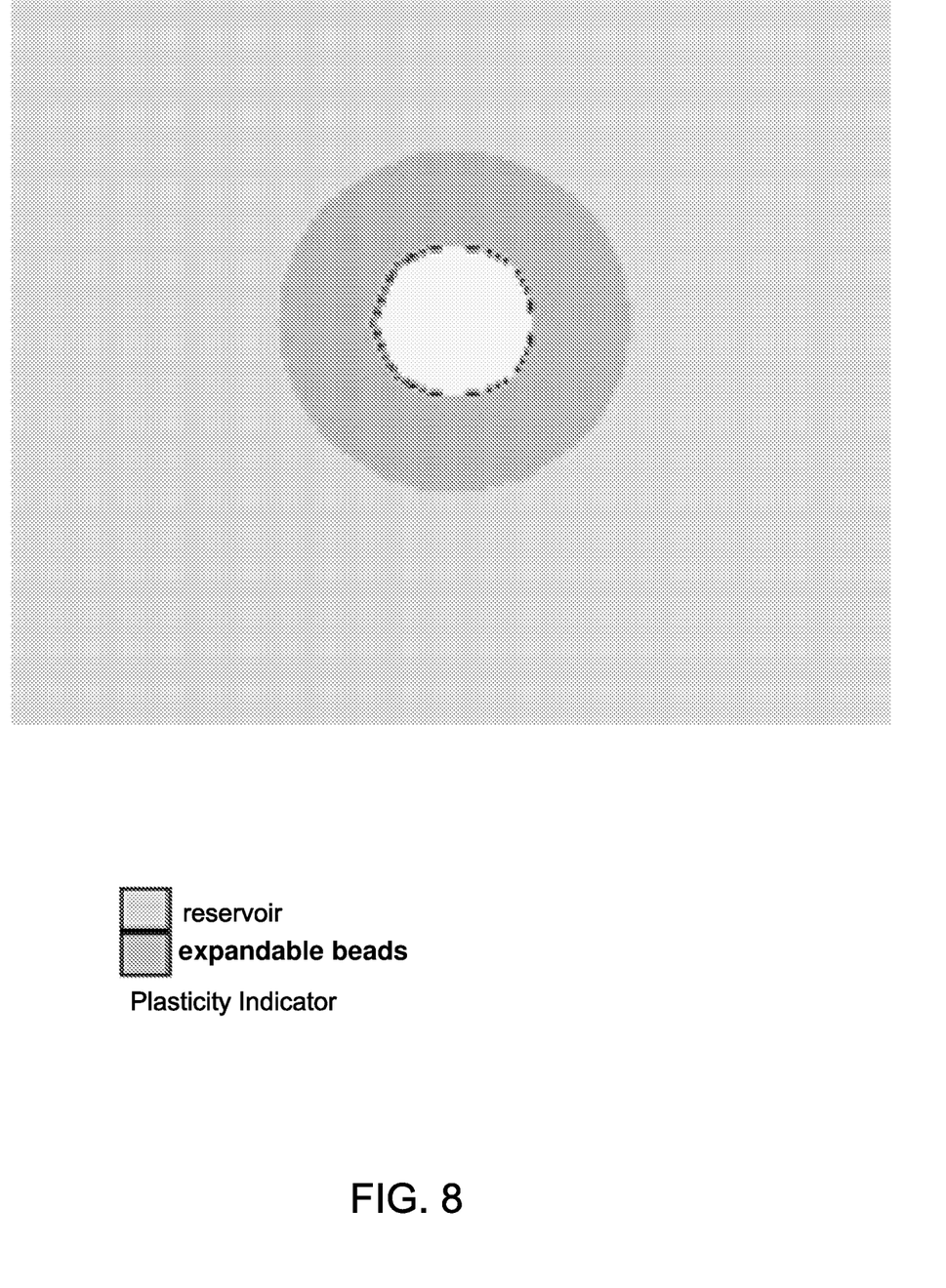
FIG. 8 is a cross section view of a modelled subterranean well having the expandable beads in accordance with an embodiment of this disclosure, showing Mechanical yielding region at drawdown of 1000 psi.

Assuming that the temperature in the pack of the expandable beads increases by 100° F. during the transition from well completion to production operations, the induced linear thermal expansion strain is 0.05. The model was then re-run with the thermal expansion induced stress considered, the distribution of effective tangential stress at steady state with a drawdown of 1000 psi is provided in FIG. 6. It can be seen that the maximum effective tangential stress in the formation around the well drops to around 6 MPa. The plasticity plot in FIG. 8 shows that the mechanical yielding region is eliminated.

As shown in FIGS. 1-2, embodiments of this disclosure provide systems and methods that require no additional work over some current completion techniques to install compressive stress in target region 40. The additional stress can be generated automatically by geothermal heat or the heat provided by reservoir fluids passing over expandable beads 12. The thermally induced stress is actively applied on the wall of wellbore 18 so that the reservoir rock surrounding subterranean well 10 will have much smaller inward movement compared to current gravel packing systems, and the mechanical damage to the rock in target region 40 can be minimized.

The disclosure presents systems and methods for the use of thermally expandable beads to fill the space between an oil well's production tubing and the wellbore to act as a filter and restrict the entry of sand into the production tubing. Under reservoir conditions these expandable beads will expand in volume. The volume expansion of bead pack in the space will introduce additional mechanical pressure against the wellbore, which will subsequently decrease the hoop stress and increase the radial confining stress in the near-well region. Therefore the mechanical failure and the sand production can be mitigated. High-stiffness thermally expandable polymeric expandable beads with neutral or water wet surface properties can be considered in cases where the reduction of the permeability caused by deformation of polymeric beads may bottleneck the flow of reservoir fluids.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for mitigating sand production from a subterranean well, the method including:
   introducing spherical expandable beads alone into a target region of a production zone of the subterranean well, the expandable beads being formed of a thermally expandable material in an unexpanded condition with a first diameter;
   thermally expanding the expandable beads so that the expandable beads are in an expanded condition with a second diameter, the second diameter being greater than the first diameter and forming a formed pack of the expandable beads alone within the target region; and
   increasing radial confining stress and decreasing a hoop stress within the target region with the formed pack.

2. The method of claim 1, where introducing the expandable beads into the target region includes introducing the expandable beads into a packing space between an outer diameter of a screen and an inner surface of the subterranean well.

3. The method of claim 1, where the expandable beads are spherical when in the unexpanded condition and when in the expanded condition.

4. The method of claim 1, where the formed pack is free of degradable materials so that a mechanical strength of the formed pack is maintained.

5. The method of claim 1, where thermally expanding the expandable beads includes heating the expandable beads with reservoir fluids.

6. The method of claim 1, where the thermally expandable material is selected from a group consisting of a polymeric material, a reinforced composite, and a metallic material.

7. A method for mitigating sand production from a subterranean well, the method including:
   locating a base pipe within a wellbore of the subterranean well;
   locating a screen exterior of the base pipe;
   introducing spherical expandable beads into a packing space between an outer diameter of the screen and an inner surface of the subterranean well at a target region of a production zone of the subterranean well, the expandable beads being formed of a polymer and having a first diameter in an unexpanded condition;
   thermally expanding the expandable beads so that the expandable beads are in an expanded condition with a second diameter, the second diameter being greater than the first diameter, and forming a formed pack of the expandable beads alone within the target region; and
   increasing a radial confining stress and decreasing a hoop stress within the target region with the formed pack.

8. The method of claim 7, where the expandable beads are substantially spherical when in the unexpanded condition and when in the expanded condition.

9. The method of claim 7, where the formed pack is free of degradable materials so that the increased radial confining stress and the decreased hoop stress is maintained.

10. The method of claim 7, where thermally expanding the expandable beads includes heating the expandable beads with a geothermal heat of the target region.

11. A system for mitigating sand production from a subterranean well, the system including:
    spherical expandable beads located in a target region of a production zone of the subterranean well; where
    the expandable beads are formed of a thermally expandable material having an unexpanded condition with a first diameter;
    the expandable beads form a formed pack of the expandable beads alone within the target region with the expandable beads in an expanded condition with a second diameter, the second diameter being greater than the first diameter; and
    the formed pack is operable to increase a radial confining stress and decrease a hoop stress within the target region.

12. The system of claim 11, where the expandable beads are located in a packing space between an outer diameter of a screen and an inner surface of the subterranean well.

13. The system of claim 12, further including a base pipe within a wellbore of the subterranean well, where the screen is located exterior of the base pipe.

14. The system of claim 11, where the expandable beads are spherical when in the unexpanded condition and when in the expanded condition.

15. The system of claim 11, where the formed pack is free of degradable materials and is operable to maintain the increased radial confining stress and decreased hoop stress.

16. The system of claim 11, where the thermally expandable material is selected from a group consisting of a polymeric material, a reinforced composite, and a metallic material.

17. The method of claim 1, where forming the formed pack of the expandable beads alone within the target region includes forming the formed pack with a bulk modulus of 20 megapascal (MPa), and where a service temperature is in a range of 340-500° F.

18. The method of claim 7, where forming the formed pack of the expandable beads alone within the target region includes forming the formed pack with a bulk modulus of 20 megapascal (MPa), and where a service temperature is in a range of 340-500° F.

19. The system of claim 11, where the formed pack has a bulk modulus of 20 megapascal (MPa), a Poisson's ratio of 0.49, a cohesive strength of 3.45 MPa (500 psi), a frictional angle of 32 degrees, and a permeability of 3 Darcy, at a service temperature in a range of 340-500° F.

* * * * *